United States Patent [19]

Mikulecky et al.

[11] 3,772,590
[45] Nov. 13, 1973

[54] METHOD OF PRODUCTION TESTING FUSES AND CIRCUIT FOR ACCOMPLISHING SUCH TESTING

[75] Inventors: Harvey W. Mikulecky; William J. Huber, both of Racine, Wis.

[73] Assignee: McGraw-Edison Company, Milwaukee, Wis.

[22] Filed: May 24, 1972

[21] Appl. No.: 256,381

[52] U.S. Cl. .............................................. 324/28 R
[51] Int. Cl. ............................................ H01h 85/30
[58] Field of Search ................... 324/28 R, 158 R, 324/72, 51, 133; 307/305

[56] References Cited
UNITED STATES PATENTS 3,517,304   6/1970   Swartz ............................... 324/28 R
3,489,926   1/1970   Adams et al. .................... 307/305 X Primary Examiner—Alfred E. Smith
Attorney—John W. Michael et al.

[57] ABSTRACT

Quality control testing of production current limiting fuses is achieved by subjecting the fuses to a minimum melt $i^2t$ (amp² seconds) condition. The fuses to be tested are connected in an electrical circuit and subjected to a test current of given magnitude for one loop of a 60 hertz source.

13 Claims, 3 Drawing Figures

PATENTED NOV 13 1973

3,772,590

METHOD OF PRODUCTION TESTING FUSES AND CIRCUIT FOR ACCOMPLISHING SUCH TESTING

BACKGROUND OF INVENTION

This invention relates to electrical testing of fuses, particularly those of the current limiting type.

The test method disclosed and claimed herein has particular application to current limiting fuses, but it will be appreciated that it may find use beyond those specific types of fuses. The finally assembled fuses must be electrically tested and also examined for structural flaws. Resistance and x-ray tests and visual checks have been proposed but these are not particularly reliable. The fuses are housed in a tube, made of porcelain, fiberglass, or like, so that visual examination must be made before final assembly, but damage to the fuse element or faulty connections can occur during final assembly. Visual examination for internal structural flaws is impossible in the case of a totally enclosed fuse and resistance and/or x-ray tests may miss some structural flaws or defects.

SUMMARY OF INVENTION

This invention is concerned with this problem of adequately testing fuses electrically and detecting structural flaws and among the general objects of this invention are to achieve reliable testing and detection.

For more specific object of this invention is to closely approximate field conditions in such testing.

For the achievement of these and other objects it is proposed that fuse ratings be considered in terms of $i^2t$, where $i$ is current and $t$ is time. That is, the fuse is rated in terms of the amount of current it can withstand for a given length of time without melting open. The magnitude of $i^2t$ needed to melt a fuse open is referred to as the "melt $i^2t$" whereas that which the fuse can withstand without melting open is referred to as the "minimum melt $i^2t$." The "minimum melt $i^2t$" is actually a preselected percentage of the "melt $i^2t$" sufficient to allow for reasonable tolerance and test variations.

The $i^2t$ test subjects the assembled fuse to a controlled current pulse and tests the fuse both electrically and structurally. The necessary magnitude of test current for a given time is selected to provide the "minimum melt $i^2t$" and the fuse is subjected to that electrical condition which will uncover both electrical faults and structural flaws. The "$i^2t$" condition is a direct measure of the electrical capability of the fuse. Furthermore, any physical damage to the fuse element during manufacture, or error in material selection, which lowers the "melt $i^2t$", will also be detected by subjecting the fuse to the "minimum melt $i^2t$." Defective fuses are thus readily detected, and are automatically rendered inoperable so that they cannot get into service.

A 60 hertz electrical source is connected to the fuse being tested and current in the fuse is controlled by providing conduction during only one loop (180°) of the 60 hertz, i.e., a test shot of one loop duration. This provides a precisely measured duration of time for the test current and the magnitude of current can then be readily computed to provide the requisite "minimum melt $i^2t$." The use of a 60 hertz source and only one loop thereof, achieves the test under closely simulated field conditions. It will be appreciated, however, that the circuit parameters can be adjusted to use more than one loop and thereby subject the fuse to a number of test shots; these repeated one loop shots also simulate the condition when a distribution transformer comes on the line.

This test procedure is extremely effective from an electrical standpoint and will detect even the smallest structural flaw in a fully assembled fuse which would be capable of impairing fuse operation, and which normally cannot be detected by resistance or x-ray testing.

Other objects and advantages will be pointed out in, or be apparent from, the specification and claims, as will obvious modifications of the embodiment shown in the drawings, in which:

DESCRIPTION OF PREFERRED EMBODIMENT

Before describing the test circuitry and the manner of carrying out the tests, it should be understood that the test arrangement can be used for testing any fuse structure. For example, it can be used for testing current limiting fuses of the type disclosed and claimed in U.S. Pat. No. 3,437,971 which is assigned to the assignee of this application. That patent discloses and claims a current limiting fuse which, after final assembly, has the fusible element completely enclosed in an outer housing. The exact details of the fuse structure are not necessary to an understanding of this invention and hence a specific fuse construction will not be described, but reference is made to the aforementioned patent for a disclosure of a typical fuse structure should such a disclosure become necessary.

Figure 1:
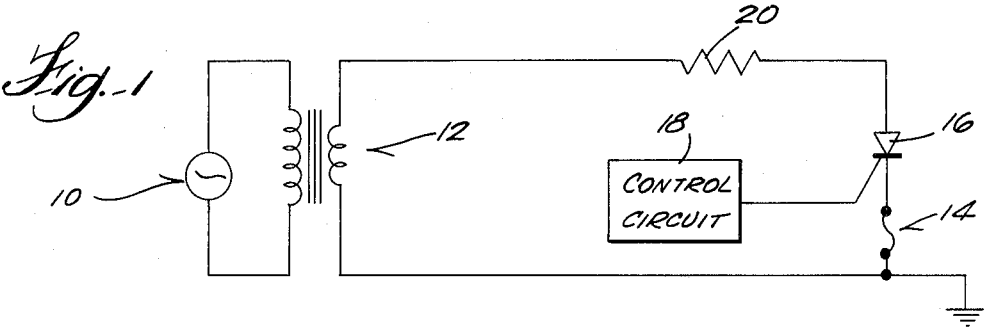
FIG. 1 is a circuit diagram illustrating the general concept of this invention.

The general concept of the testing procedure will be described in connection with the general showing of FIG. 1. An electrical source 10 is connected through step down transformer 12 to a circuit branch including fuse 14 which is to be tested. Current in fuse 14 is controlled by SCR 16 which is in turn controlled by control circuit 18. The control circuit 18 is designed such that it will place the necessary gating signal on the gate of SCR 16 such that the SCR will be rendered conductive for one loop of the electrical source 10. More specifically, source 10 is a 60 hertz source and the voltage in primary 12 will also be 60 hertz and control circuit 18 is designed to turn SCR 16 "on" for one loop of the 60 hertz. This invention is not limited to 60 hertz and can be used with any frequency power source. Preferably, the SCR is automatically turned off at the end of that loop when the source passes through the voltage, or current, zero. Thus the time of test current in fuse 14 is precisely controlled to exactly one loop of the 60 hertz source, i.e., 8.33 milliseconds. Resistance 20 is selected to provide the necessary current magnitude to provide the minimum melt $i^2t$ condition.

Figure 2:
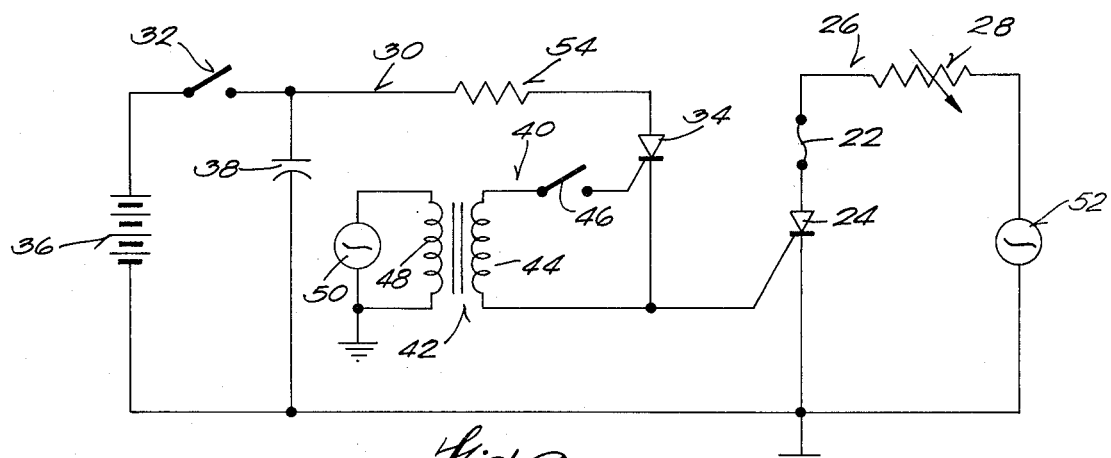
FIG. 2 is a more specific circuit diagram illustrating a preferred embodiment.

FIG. 2 depicts circuitry for carrying out the $i^2t$ test and for achieving single loop conduction for test purposes. Test fuse 22 is connected in series with SCR 24, the latter controlling conduction in branch 26 of the test circuit. Variable resistance 28 is also included in the circuit to provide adjustment to achieve the desired test current magnitude.

Circuit branch 30 controls the conductive state of SCR 24 in a manner, now to be described, whereby SCR 24 is on for one loop of a 60 hertz source. When switch 32 is closed, and assuming SCR 34 is to be "off,"

capacitor 38 is charged from D.C. source 36. The conductive state of SCR 34 is controlled by control circuit branch 40 including a transformer 42 having its secondary 44 connected to the gate of SCR 34 through a switch 46. Primary 48 is connected to A.C. source 50 which is in phase with voltage 52 across SCR 24. To achieve this in-phase relationship source 50 is preferably a tap off of source 52, both sources 50 and 52 being 60 hertz. It will be noted that the voltage in secondary 44 will, because of this relationship, be 180° out of phase with primary 48 and correspondingly the voltage on SCR 24 (i.e., source 52).

In operation, capacitor 38 is charged above the trigger voltage for SCR 24 and, when charged, switch 32 is opened with capacitor 38 being ready to discharge through SCR 34 when the latter is rendered conductive, i.e., turned on. The discharge characteristics are determined by the RC network formed by capacitor 38 and resistance 54. SCR 34 will be turned on, assuming switch 46 is closed, when its gate is positive relative to its annode, the latter can be considered as continuously positive because of its connection to D.C. source 36. This positive condition of the gate of SCR 34 occurs on alternate half cycles of source 50 and thus SCR 34 is turned on on alternate half cycles. However, because of the 180° out of phase relationship between secondary 44 and source 52, when SCR 34 is turned on allowing capacitor 38 to discharge through it and place the necessary signal on the gate of SCR 24 to turn that SCR on the voltage condition on the SCR is such that its annode is negative relative to its cathode and it will not turn on. The discharge time constant of the RC network formed by capacitor 38 and resistance 54 is selected such that the discharge voltage of capacitor 38 remains above the trigger voltage of SCR 24 until the subsequent loop (one-half cycle) of source 52 is initiated. In the disclosed embodiment the discharge voltage will decay below the trigger voltage before the end of that loop so that SCR 24 is turned off at end of that loop as a zero voltage condition is crossed.

Figure 3:
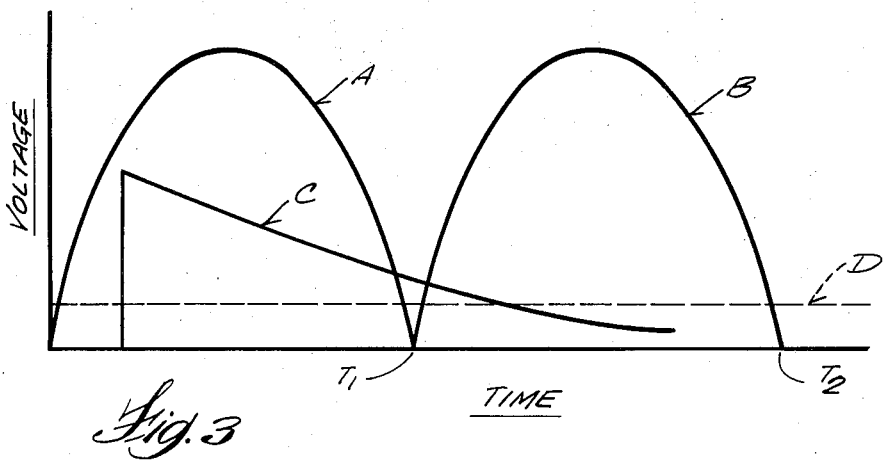
FIG. 3 is a plotting of voltage vs. time for the various control components of FIG. 2.

This out-of-phase relationship and single loop energization can perhaps be better understood by reference to FIG. 3 wherein voltage is plotted against time, A plots voltage at the gate of SCR 34, B plots the voltage on SCR 24, D the trigger voltage of SCR 24, and C plots the discharge curve for capacitor 38. As can be seen, when the signal on the gate of SCR 34 is positive (curve or loop A) and capacitor 38 is discharging the voltage across SCR 24 has a negative sense (graphically that loop of B which would appear below loop A but has not been illustrated) but the capacitor discharge voltage (curve C) remains above the SCR trigger voltage (curve D) as the voltage on SCR 24 transfers to a positive sense (loop or curve B). SCR 24 will be turned on at time $T_t$. The capacitor voltage decays to a valve below trigger voltage during the single loop B and SCR 24 will be turned off at $T_2$, i.e., at the end of the single loop. This arrangement turns SCR 24 on precisely at the start of a single loop and turns it off precisely at the end of that loop giving an exact duration of time for the $i^2t$ test, on 60 hertz this equals 8.33 milliseconds.

As can be seen from the foregoing specific description of the circuit of FIG. 2, the time of the test current in test fuse 22 is precisely controlled, i.e., to a single loop of the 60 hertz source. This provides one test shot for the test fuse 22 such that if the fuse element has been damaged or otherwise affected so that its minimum melt $i^2t$ is below the rated minimum melt $i^2t$ the fuse element will be melted open and the fuse is rejected. Providing a one shot test on a basis of a 60 hertz system provides the electrical test under conditions which very closely approximate actual field conditions. That is the time of the test shot is similar to the abnormal conditions to which the fuse might be subjected in the field and, moreover, the test shot is relatively symmetrical as might also be expected from a fault condition in the field.

Although a single shot test situation has been described, it will be appreciated that repeated test shots can be achieved by adjusting the RC time constant discharge for capacitor 38. In other words, the values of resistance 54 and capacitor 38 can be selected to vary the slope of curve C as viewed in FIG. 3 such that the discharge voltage from the capacitor does not fall below trigger voltage D as illustrated in FIG. 3. More particularly, the curve could be extended so that it remains above the trigger voltage for subsequent positive phase loops of the voltage on SCR 24 (curve B). Accordingly, the SCR 24 will still be turned off at the end of a given (loop B) because after passing through current O, $T_2$, the relative potential of the annode, gate and cathode of SCR 24 would be improper for conduction during the negative phase of the voltage curve for SCR 24.

However, on the next phase change from negative to positive in the voltage on SCR 24, trigger voltage would still be on the gate of the SCR and it would be rendered conductive for a second single loop. Thus, the SCR can be rendered conductive on alternate loops of the voltage source 52, i.e., on each positive phase thereof, and will sujbect the fuse to repeated test shots. But each shot is again precisely timed, i.e., one loop. These repeated test shots are similar to the condition which a fuse might encounter as a distribution transformer is brought on line, and thus the characteristic of simulating field conditions which might be encountered in use is preserved.

Although but one embodiment of the present invention has been illustrated and described, it will be apparent to those skilled in the art that various changes and modifications may be made therein without departing from the spirit of the invention or from the scope of the appended claims.

We claim:

1. A test circuit for a fuse comprising in combination, an electrical source,
means for connecting a fuse across said electrical source,
means for providing a test current of preselected magnitude in said fuse,
switch means selectively operable to complete the circuit for said fuse and subject said fuse to said test current,
and means controlling the operation of said switch means and operating said switch means to complete said circuit for a preselected time,
said duration of time and said current magnitude are characterized by being such as to provide a minimum melt $i^2t$ for said fuse wherein $i$ is said test current and $t$ is said preselected time.

2. The test circuit of claim 1 wherein
said electrical source is a 60 hertz source,
and said switch means is rendered conductive for one loop of said 60 hertz.

3. The test circuit of claim 2 wherein
said switch means is rendered operative upon receipt of a control signal from said control means during one phase of said 60 hertz source,
and said control means applies said control signal as said 60 hertz source is changing to said one phase and removes said control signal before said one phase again changes so that said switch means is rendered conductive and said fuse is subjected to said test current for precisely one loop of said 60 hertz.

4. The test circuit of claim 2 wherein
said switch means comprises first electronic switch means characterized by being rendered conductive in response to receipt of a control signal during one phase of said 60 hertz source,
said control means includes a second electronic switch means operative to provide said control signal but being out-of-phase with said 60 hertz source to apply said control signal to said first electronic switch means prior to said 60 hertz source being in said one phase,
and said control means further operative to maintain said control signal on said switch means until said 60 hertz source changes to said one phase so that said first electronic switch means is rendered conductive precisely as said 60 hertz source changes to said one phase.

5. The test circuit of claim 2
wherein said switch means comprises a first SCR connected across said 60 hertz source and in series with said fuse, said SCR being capable of conduction when said 60 hertz source is in one phase,
wherein said control means includes a second SCR connected to the gate of said first SCR,
including a source of potential connected to and controlled by said second SCR,
wherein said control means further includes a control signal generating means connected to said second SCR to selectively turn "on" said second SCR and apply the necessary signal to said first SCR to render that SCR conductive, said control signal generating means being out-of-phase with said 60 hertz source to apply said necessary signal prior to said 60 hertz source being in said one phase and maintaining said necessary signal until said 60 hertz source changes to said one phase.

6. The test circuit of claim 5 wherein
said control signal generating means includes a first A.C. source in phase with said 60 hertz source, and means for shifting the phase of said A.C. source 180° relative to said 60 hertz source.

7. The test circuit of claim 6 wherein
said phase shifting means comprises a transformer having its primary connected to said first A.C. source and its secondary connected to the gate of said second SCR.

8. The test circuit of claim 7 wherein said source of potential comprises a capacitor capable of charging above the trigger voltage of said first SCR and having decay characteristics such that said trigger voltage is held until said 60 hertz source changes to said one phase.

9. The test circuit of claim 4 wherein said source of potential comprises a capacitor capable of charging above the trigger voltage of said first SCR and having decay characteristics such that said trigger voltage is held until said 60 hertz source changes to said one phase.

10. The first circuit of claim 9 wherein the decay characteristics of said capacitor are further characterized by said charge thereon decaying below said trigger voltage before said 60 hertz source changes from said one phase.

11. The method of testing a fuse comprising the steps of providing a preselected magnitude of current,
and selectively applying said current to said fuse for a preselected duration of time,
wherein said duration of time and said current are selected to provide a value of $i^2t$ ($i$ being said current and $t$ being time) equal to the minimum melt $i^2t$ for said fuse.

12. The method of claim 11 wherein said preselected duration of time is a single loop of a 60 hertz electrical source.

13. A test circuit for a fuse comprising in combination,
an A.C. voltage source for said fuse,
switch means connected in circuit with said fuse and said voltage source for controlling test current in said fuse and having a non-conductive state and being turned "on" in response to a combination of said control signal and the phase of said voltage source,
means for providing said control signal to said switch means,
and control means for operatively connecting said control signal providing means to said switch means and being 180° out-of-phase operatively with said A.C. voltage source but capable of holding said signal on said switch means through a change in phase of said A.C. voltage source whereby said switch means applies test current to said fuse at the start of the loop of said A.C. voltage source subsequent to that loop in which said control means is operated.

* * * * *